(12) United States Patent
Xue et al.

(10) Patent No.: US 9,610,564 B2
(45) Date of Patent: Apr. 4, 2017

(54) $NO_x$ STORAGE CATALYST WITH IMPROVED HYDROTHERMAL STABILITY AND $NO_x$ CONVERSION

(71) Applicant: BASF Corporation, Florham Park, NJ (US)

(72) Inventors: Wen-Mei Xue, Dayton, NJ (US); Xinyi Wei, Princeton, NJ (US); Marcus Hilgendorff, Hannover Bemerode (DE); Patrick Burk, Freehold, NJ (US)

(73) Assignee: BASF Corporation, Florham Park, NJ (US)

( * ) Notice: Subject to any disclaimer, the term of this patent is extended or adjusted under 35 U.S.C. 154(b) by 254 days.

(21) Appl. No.: 14/204,386

(22) Filed: Mar. 11, 2014

(65) Prior Publication Data

US 2014/0260214 A1    Sep. 18, 2014

Related U.S. Application Data

(60) Provisional application No. 61/778,871, filed on Mar. 13, 2013.

(51) Int. Cl.
*B01D 50/00* (2006.01)
*B01J 23/10* (2006.01)
(Continued)

(52) U.S. Cl.
CPC .......... *B01J 23/10* (2013.01); *B01D 53/9481* (2013.01); *B01J 23/63* (2013.01); *B01J 35/002* (2013.01);
(Continued)

(58) Field of Classification Search
CPC .. F01N 33/101; F01N 3/2066; F01N 2250/02; B01D 2258/012; B01D 2255/1021; B01J 2523/00
(Continued)

(56) References Cited

U.S. PATENT DOCUMENTS 4,965,243 A    10/1990  Yamada et al.
5,064,803 A *  11/1991  Nunan ................. B01D 53/945
                                              502/170
(Continued)

FOREIGN PATENT DOCUMENTS

EP    0407915 A2    1/1991
EP    0716876 A1    6/1996
(Continued)

OTHER PUBLICATIONS

International Search Report dated Aug. 27, 2014.

*Primary Examiner* — Tom P Duong
(74) *Attorney, Agent, or Firm* — Womble Carlyle Sandridge & Rice LLP

(57) ABSTRACT

A lean $NO_x$ trap for the treatment of exhaust gas emissions, such as the oxidation of unburned hydrocarbons (HC), and carbon monoxide (CO), and the trapping and reduction of nitrogen oxides ($NO_x$) is disclosed. Nitrogen oxide storage catalysts can comprise a layer on a substrate including ceria-alumina particles having a ceria phase present in a weight percent of the composite in the range of about 20% to about 80% on an oxide basis, an alkaline earth metal component supported on the ceria-alumina particles, wherein the $CeO_2$ is present in the form of crystallites that are hydrothermally stable and have an average crystallite size less than 130 Å after aging at 950° C. for 5 hours in 2% $O_2$ and 10% steam in $N_2$.

20 Claims, 8 Drawing Sheets

(51) Int. Cl.
*B01J 37/02* (2006.01)
*B01J 35/00* (2006.01)
*B01J 23/63* (2006.01)
*B01J 35/02* (2006.01)
*B01J 37/10* (2006.01)
*B01D 53/94* (2006.01)

(52) U.S. Cl.
CPC ......... *B01J 35/0006* (2013.01); *B01J 35/023* (2013.01); *B01J 37/0201* (2013.01); *B01J 37/0244* (2013.01); *B01J 37/0248* (2013.01); *B01J 37/10* (2013.01); *B01D 53/9422* (2013.01); *B01D 2255/102* (2013.01); *B01D 2255/1021* (2013.01); *B01D 2255/1023* (2013.01); *B01D 2255/1025* (2013.01); *B01D 2255/1028* (2013.01); *B01D 2255/2042* (2013.01); *B01D 2255/2065* (2013.01); *B01D 2255/40* (2013.01); *B01D 2255/9022* (2013.01); *B01D 2255/91* (2013.01); *B01D 2258/012* (2013.01); *B01J 2523/00* (2013.01)

(58) Field of Classification Search
USPC .................................. 422/177; 502/304, 174
See application file for complete search history.

(56) References Cited

U.S. PATENT DOCUMENTS

| | | |
|---|---|---|
| 5,075,275 A | 12/1991 | Murakami et al. |
| 5,702,675 A | 12/1997 | Takeshima et al. |
| 6,221,804 B1 | 4/2001 | Yamada et al. |
| 6,296,822 B1 | 10/2001 | Hepburn et al. |
| 6,375,910 B1 | 4/2002 | Deeba et al. |
| 6,585,945 B2 | 7/2003 | Wu et al. |
| 6,777,370 B2 | 8/2004 | Chen |
| 6,923,945 B2 | 8/2005 | Chen |
| 7,490,464 B2 | 2/2009 | Li et al. |
| 7,832,203 B2 | 11/2010 | Chiffey |
| 2003/0045424 A1 | 3/2003 | Deeba et al. |
| 2004/0048741 A1 | 3/2004 | Poulston et al. |
| 2004/0198595 A1 | 10/2004 | Chen |
| 2005/0129601 A1 | 6/2005 | Li et al. |
| 2009/0297416 A1 | 12/2009 | Rohart et al. |
| 2011/0120086 A1 | 5/2011 | Gidney et al. |
| 2012/0023915 A1 | 2/2012 | Hilgendorff et al. |
| 2013/0177484 A1 | 7/2013 | Naito et al. |

FOREIGN PATENT DOCUMENTS

| | | |
|---|---|---|
| EP | 1138384 A2 | 10/2001 |
| GB | 2736903 | 12/2002 |
| JP | 2013-146693 | 8/2013 |
| WO | 2012147411 A1 | 11/2012 |

\* cited by examiner

NO$_x$ STORAGE CATALYST WITH IMPROVED HYDROTHERMAL STABILITY AND NO$_x$ CONVERSION

CROSS-REFERENCE TO RELATED APPLICATIONS

This application claims the benefit of priority under 35 U.S.C. §119(e) to U.S. Provisional Patent Application No. 61/778,871, filed on Mar. 13, 2013, which is hereby incorporated by reference in its entirety.

TECHNICAL FIELD

The present invention is directed to nitrogen oxide storage materials and methods for their use. More particularly, the invention pertains to NO$_x$ storage materials that are resistant to thermal aging and methods of using the materials. The nitrogen oxide storage materials may be part of a catalytic trap used to treat exhaust gas streams, especially those emanating from lean burn gasoline engines.

BACKGROUND

Emission of nitrogen oxides (NO$_x$) from lean burn engines must be reduced in order to meet emission regulation standards. Conventional three-way conversion (TWC) automotive catalysts are suitable for abating NO$_x$, carbon monoxide a (CO) and hydrocarbon (HC) pollutants in the exhaust of engines operated at or near stoichiometric air/fuel conditions. The precise proportion of air to fuel which results in stoichiometric conditions varies with the relative proportions of carbon and hydrogen in the fuel. An air-to-fuel (A/F) ratio of 14.65:1 (weight of air to weight of fuel) is the stoichiometric ratio corresponding to the combustion of a hydrocarbon fuel, such as gasoline, with an average formula CH$_{1.88}$. The symbol λ is thus used to represent the result of dividing a particular A/F ratio by the stoichiometric A/F ratio for a given fuel, so that; λ=1 is a stoichiometric mixture, λ>1 is a fuel-lean mixture and λ<1 is a fuel-rich mixture.

Engines, especially gasoline-fueled engines to be used for passenger automobiles and the like, are being designed to operate under lean conditions as a fuel economy measure. Such future engines are referred to as "lean burn engines." That is, the ratio of air to fuel in the combustion mixtures supplied to such engines is maintained considerably above the stoichiometric ratio (e.g., at an air-to-fuel weight ratio of 18:1) so that the resulting exhaust gases are "lean," i.e., the exhaust gases are relatively high in oxygen content. Although lean-burn engines provide advanced fuel economy, they have the disadvantage that conventional TWC catalysts are not effective for reducing NO$_x$ emissions from such engines because of excessive oxygen in the exhaust. Attempts to overcome this problem have included the use of a NO$_x$ trap. The exhaust of such engines is treated with a catalyst/NO$_x$ sorbent which stores NO$_x$ during periods of lean (oxygen-rich) operation, and releases the stored NO$_x$ during the rich (fuel-rich) periods of operation. During periods of rich (or stoichiometric) operation, the catalyst component of the catalyst/NO$_x$ sorbent promotes the reduction of NO$_x$ to nitrogen by reaction of NO$_x$ (including NO$_x$ released from the NO$_x$ sorbent) with HC, CO, and/or hydrogen present in the exhaust.

Diesel engines provide better fuel economy than gasoline engines and normally operate 100% of the time under lean conditions, where the reduction of NO$_x$ is difficult due to the presence of excess oxygen. In this case, the catalyst/NO$_x$ sorbent is effective for storing NO$_x$. As in the case of the gasoline partial lean burn application, after the NO$_x$ storage mode, a transient rich condition must be utilized to release/reduce the stored NO$_x$ to nitrogen. In the case of the diesel engine, this transient reducing condition will require unique engine calibration or injection of a diesel fuel into the exhaust to create the next reducing environment.

NO$_x$ storage (sorbent) components including alkaline earth metal oxides, such as oxides of Mg, Ca, Sr, and Ba, alkali metal oxides such as oxides of Li, Na, K, Rb, and Cs, and rare earth metal oxides such as oxides of Ce, La, Pr, and Nd in combination with precious metal catalysts such as platinum dispersed on an alumina support have been used in the purification of exhaust gas from an internal combustion engine. For NO$_x$ storage, baria is usually preferred because it forms nitrates at lean engine operation and releases the nitrates relatively easily under rich conditions. However, catalysts that use baria for NO$_x$ storage exhibit a problem in practical application, particularly when the catalysts are aged by exposure to high temperatures and lean operating conditions. After such exposure, such catalysts show a marked decrease in catalytic activity for NO$_x$ reduction, particularly at low temperature (200 to 350° C.) and high temperature (450° C. to 600° C.) operating conditions. In addition, NO$_x$ absorbents that include baria suffer from the disadvantage that when exposed to temperatures above 450° C. in the presence of CO$_2$, barium carbonate forms, which becomes more stable than barium nitrate. Furthermore, barium tends to sinter and to form composite compounds with support materials, which leads to the loss of NO$_x$ storage capacity.

In a reducing environment, a lean NO$_x$ trap (LNT) activates reactions by promoting a steam reforming reaction of hydrocarbons and a water gas shift (WGS) reaction to provide H$_2$ as a reductant to abate NO$_x$. The water gas shift reaction is a chemical reaction in which carbon monoxide reacts with water vapor to form carbon dioxide and hydrogen. The presence of ceria in an LNT catalyzes the WGS reaction, improving the LNT's resistance to SO$_2$ deactivation and stabilizing the PGM. NO$_x$ storage materials comprising barium (BaCO$_3$) fixed to ceria (CeO$_2$) have been reported, and these NO$_x$ materials have exhibited improved thermal aging properties. Ceria, however, suffers from severe sintering upon hydrothermal aging at high temperatures. The sintering not only causes a decrease in low temperature NO$_x$ capacity and WGS activity, but also results in the encapsulation of BaCO$_3$ and PGM by the bulk CeO$_2$. LNT generate high N$_2$O emissions when the LNT is placed in an underfloor position because N$_2$O formation in the LNT increases with decreasing temperature. Placing the LNT closer to the engine can reduce N$_2$O emissions, which requires high hydrothermal stability. Thus, there is a need for a ceria-containing LNT that is hydrothermally stable.

SUMMARY

Embodiments of a first aspect of the invention are directed to a nitrogen oxide storage catalyst. In one or more embodiments, the nitrogen oxide storage catalyst comprises a layer on a substrate including ceria-alumina particles having a ceria phase present in a weight percent of the composite in the range of about 20% to about 80% on an oxide basis, an alkaline earth metal component supported on the ceria-alumina particles. In one or more embodiments, the CeO$_2$ is present in the form of crystallites that are hydrothermally stable and have an average crystallite size of less than 130 Å after aging at 950° C. for 5 hours in 2% $O_2$ and 10% steam in $N_2$.

In one or more embodiments, the layer comprises a first washcoat layer on the substrate and a second washcoat layer on the first washcoat layer.

In one or more embodiments, the alkaline earth metal component comprises a barium component. In specific embodiments, a barium component is present in an amount in the range of about 5% to 30% by weight on an oxide basis of the first layer. In one or more specific embodiments, the barium component is selected from the group consisting of barium oxide and barium carbonate.

In one or more embodiments, the nitrogen oxide storage catalyst further comprises at least one platinum group metal selected from the group consisting of platinum, palladium, rhodium, iridium, and mixtures thereof, supported on the ceria-alumina particles. In specific embodiments, the platinum group metal is selected from platinum, palladium, rhodium, and mixtures thereof.

A second aspect of the invention is directed to a nitrogen oxide storage catalyst. In one or more embodiments, the nitrogen oxide storage catalyst comprises a first layer on a substrate including ceria-alumina particles having an alkaline earth metal component supported on the particles; and a second layer on the first layer, the second layer including ceria-alumina particles substantially free of alkaline earth metal, wherein the ceria-alumina particles include a ceria phase present in a weight percent of the composite in the range of about 20% to about 80% on an oxide basis.

In one or more embodiments, the alkaline earth metal component comprises a barium component. In specific embodiments, the barium component is present in an amount of in the range of about 5% to 30% by weight on an oxide basis of the first layer.

In one or more embodiments, the first layer and second layer further comprise at least one member of platinum group metals selected from the group consisting of platinum, palladium, rhodium, iridium and mixtures thereof, supported on the ceria-alumina particles. In specific embodiments, the platinum group metal in the first layer is selected from platinum, palladium and mixtures thereof. In more specific embodiments, the platinum group metal in the first layer consists essentially of platinum and palladium. In a very specific embodiment, the platinum group metal in the first layer consists essentially of Pt. In specific embodiments, the platinum group metal in the second layer is selected from platinum, rhodium and mixtures thereof. In more specific embodiments, the platinum group metal in the second layer consists essentially of platinum and rhodium. In a very specific embodiment, the platinum group metal in the second layer consists essentially of rhodium.

In one or more embodiments, the $CeO_2$ crystallite size as determined by XRD after aging the catalytic article at 950° C. for 5 hours in 2% $O_2$ and 10% steam/$N_2$ is less than 130 Å.

In one or more embodiments, the first layer is disposed on a honeycomb substrate.

In one or more embodiments, the composite of $CeO_2$ and $Al_2O_3$ contains ceria in an amount in the range of about 30 to 70% by weight on an oxide basis. In specific embodiments, the composite of $CeO_2$ and $Al_2O_3$ in the second layer contains ceria in an amount in the range of about 30 to 60% by weight on an oxide basis.

A further aspect of the invention is directed to a system. In one or more embodiments, the system comprises the nitrogen oxide storage catalyst of one or more embodiments and a lean burn engine upstream from the nitrogen oxide storage catalyst. In specific embodiments, the system further comprises a catalyst and, optionally, a particulate filter. In a more specific embodiment, the catalyst is selected from a TWC catalyst, SCR catalyst, and diesel oxidation catalyst.

DETAILED DESCRIPTION

Figure 1:
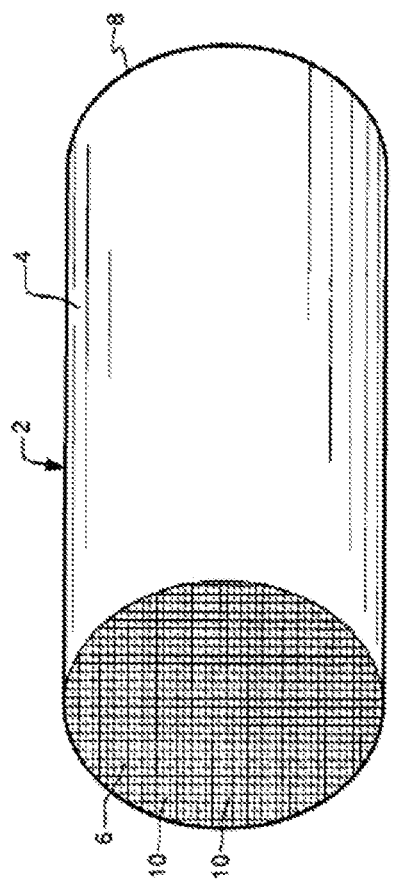
FIG. 1 is a perspective view of a honeycomb-type refractory substrate member which may comprise a $NO_x$ trap (LNT) washcoat composition according to an embodiment.

Before describing several exemplary embodiments of the invention, it is to be understood that the invention is not limited to the details of construction or process steps set forth in the following description. The invention is capable of other embodiments and of being practiced or being carried out in various ways.

According to embodiments of the invention, it has been discovered that incorporating a barium component ($BaCO_3$) into ceria-alumina ($CeO_2/Al_2O_3$) has a tremendous stabilization effect on $CeO_2$ and, thus, provides an LNT catalyst material with improved hydrothermal stability, higher $NO_x$ trapping capacity, and higher $NO_x$ conversion than traditional LNT technologies.

In one or more embodiments, a LNT catalyst comprises a layer on a substrate including ceria-alumina particles having a ceria phase present in a weight percent of the composite in the range of about 20% to about 80% on an oxide basis, and an alkaline earth metal component supported on the ceria-alumina particles. The average $CeO_2$ crystallite size of the fresh and aged samples, obtained from XRD, can be used as a measurement for $CeO_2$ hydrothermal stability. Accordingly, in one or more embodiments, the $CeO_2$ is present in the form of crystallites that are hydrothermally stable and have an average crystallite size of less than 130 Å after aging at 950° C. for 5 hours in 2% $O_2$ and 10% steam in $N_2$.

With respect to the terms used in this disclosure, the following definitions are provided.

As used herein, the term "average crystallite size" refers to the mean size as determined by XRD described below.

As used herein, the term "XRD" refers to x-ray diffraction crystallography, which is a method of determining the atomic and molecular structure of a crystal. In XRD, the crystalline atoms cause a beam of x-rays to diffract into many specific directions. By measuring the angles and intensities of these diffracted beams, a three-dimensional image of the density of electrons within the crystal can be produced. From this electron density, the position of the atoms in the crystal can be determined, as well as their chemical bonds, their disorder, and other information. In particular, XRD can be used to estimate crystallite size; the peak width is inversely proportional to crystallite size; as the crystallite size gets smaller, the peak gets broader. In one or more embodiments, XRD is used to measure the average crystallite size of the $CeO_2$ particles.

The width of an XRD peak is interpreted as a combination of broadening effects related to both size and strain. The formulas used to determine both are given below. The first equation below is the Scherrer equation which is used to transform full width at half maximum intensity, FWHM, information into a crystallite size for a given phase. The second equation is used to calculate strain in a crystal from peak width information and the total width or breadth of a peak considered to be a sum of these two effects as shown in the third equation. It should be noticed that size and strain broadening vary in different fashions with regard to the Bragg angle θ. The constants for the Scherrer equation are discussed below.

$$\beta_L = \frac{K\lambda}{L\cos\theta}$$

$$\beta_e = C\varepsilon\tan\theta$$

$$\beta_{tot} = \beta_e + \beta_L = C\varepsilon\tan\theta + \frac{K\lambda}{L\cos\theta}$$

The constants for the Scherrer equation are

K: shape constant, we use a value of 0.9

L: the peak width, this is corrected for the contribution from the instrumental optics through the use of NIST SRM 660b $LaB_6$ Line Position & Line Shape Standard Θ: ½ of the 2θ value of the reflection of interest λ: wavelength of radiation 1.5406 Å

Crystallite size is understood to be the length of the coherent scattering domain in a direction orthogonal to the set of lattice planes which give rise to the reflection. For $CeO_2$, the $CeO_2$ 111 reflection is the most intense peak in the X-ray diffraction pattern of $CeO_2$. The $CeO_2$ (111) plane of atoms intersects each of the crystallographic axes at unity and is orthogonal to the body diagonal represented by the <111> vector. So, a crystallite size of 312 Å calculated from the FWHM of the $CeO_2$ 111 reflection would be considered to be roughly 100 layers of the (111) plane of atoms.

Different directions, and thus reflections, in a crystal will generate different though close crystallite size values. The values will be exact only if the crystal is a perfect sphere. A Williamson Hall plot is used to interpret size and strain effects by considering the total peak breadth as a linear equation below with the slope of the line representing strain and the intercept being the size of a crystal.

$$\beta_{tot}\cos\theta = C\varepsilon\sin\theta + \frac{K\lambda}{L}$$

To determine the crystallite size of a material FWHM value of a single reflection or from the complete X-ray diffraction pattern is determined. Traditionally a single reflection has been fit to determine the FWHM value of that reflection, corrected the FWHM value for the contribution from the instrument, and then converted the corrected FWHM value into a crystallite size value using the Scherrer equation. This would be done by ignoring any effect from strain in the crystal. This method has been used primarily for questions concerning the crystallite size of precious metals for which we have only a single useful reflection. It should be noted that in fitting peaks it is desired to have a clean reflection which is not overlapped by reflections from other phases. This is rarely the case with present washcoat formulations Rietveld methods are now used. Rietveld methods allow the fit of complex X-ray diffraction patterns using the known crystal structures of the phases present. The crystal structures act as restraints or brakes on the fitting process. Phase content, lattice parameters, and FWHM information are varied for each phase until the overall model matches the experimental data.

In the Examples below, Rietveld methods were used to fit experimental patterns for fresh and aged samples. A FWHM curve determined for each phase in each sample was used to determine a crystallite size. Strain effects were excluded.

As used herein, the term "space velocity" refers to the quotient of the entering volumetric flow rate of the reactants divided by the reactor volume (or the catalyst bed volume) which indicates how many reactor volumes of feed can be treated in a unit time. Space velocity is commonly regarded as the reciprocal of the reactor space time.

As used herein, the term "alkaline earth metal" refers to one or more chemical elements defined in the Periodic Table of Elements, including beryllium (Be), magnesium (Mg), calcium (Ca), strontium (Sr), barium (Ba), and radium (Ra). In one or more embodiments, the alkaline earth metal component can be incorporated into the layer as a salt and/or oxide (e.g., $BaCO_3$) to provide an "alkaline earth metal component". In one or more embodiments, the alkaline earth metal component comprises a barium component. The alkaline earth metal component can be present in the washcoat in an amount in the range of about 5% to 30% by weight on an oxide basis. In a specific embodiment, the alkaline earth metal component comprises a barium component, which is present in an amount in the range of about 5% to about 30% by weight on an oxide basis.

In one or more embodiments, the LNT or nitrogen oxide storage catalyst can further comprise at least one platinum group metal supported on the ceria-alumina particles. As used herein, the term "platinum group metal" or "PGM" refers to one or more chemical elements defined in the Periodic Table of Elements, including platinum, palladium, rhodium, osmium, iridium, and ruthenium, and mixtures thereof. In one or more embodiments, the platinum group metal is selected from the group consisting of platinum, palladium, rhodium, iridium, and mixtures thereof. In a specific embodiment, the platinum group metal is selected from platinum, palladium, rhodium, and mixtures thereof.

Figure 7:
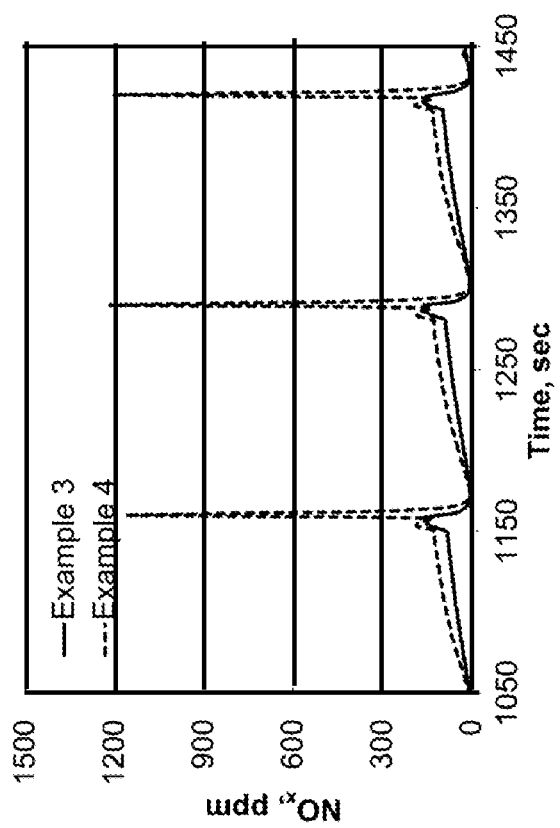
FIG. 7 is a graph of the outlet $NO_x$ concentrations in the lean/rich cycle test at 250° C. as described in Example 5 according to the Examples 3 and 4 after aging at 950° C. for 5 hours in 2% $O_2$ and 10% steam in $N_2$.

In one or more embodiments, the layer on the substrate comprises a first washcoat layer on the substrate and a second washcoat layer on the first washcoat layer. The alkaline earth metal component can comprise a barium component in amount in the range of about 5% to 30% by weight on an oxide basis of the first washcoat layer. In a specific embodiment, the LNT contains a bottom coat (or first layer) of Pt/Pd supported on $BaCO_3/(CeO_2—Al_2O_3)$ particles, and a topcoat (or second layer) of Pt/Rh supported on ($CeO_2$—$Al_2O_3$) particles. Without intending to be bound by theory, it is thought that the Rh is stabilized by Pt so as to provide more efficient $NO_x$ reduction and result in reduced $NO_x$ break-through during rich regeneration. Additionally, Rh is more efficient in $NO_x$ reduction when Pt/Rh is supported on $CeO_2$/$Al_2O_3$ particles. Referring to FIG. 7, in a control experiment, when Pt/Rh is supported on a physical mixture of $CeO_2$ and $Al_2O_3$, $NO_x$ reduction is poor.

Figure 3:
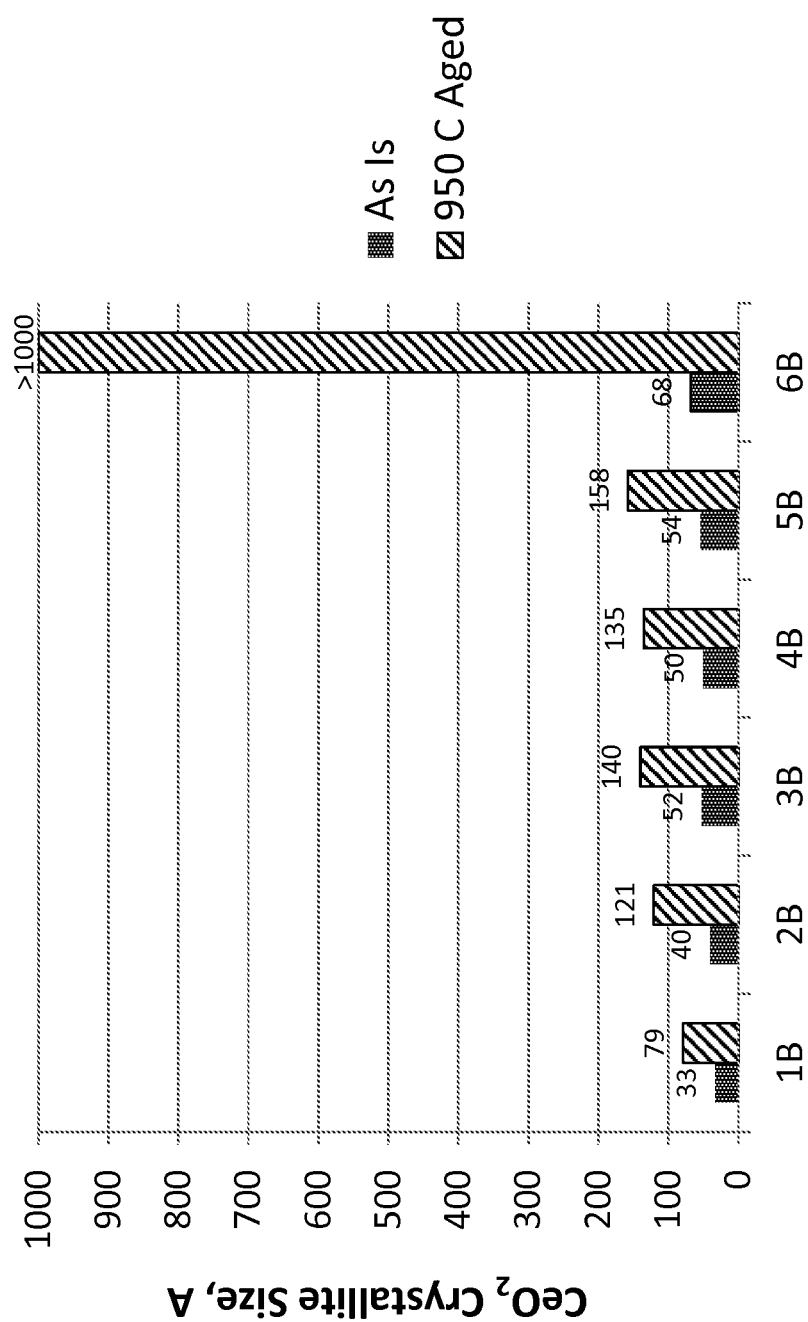
FIG. 3 is a graph of crystallite size of the $CeO_2$ as measured by XRD according to the Examples 1B-6B in fresh and after aging at 950° C. for 5 hours in 2% $O_2$ and 10% steam in $N_2$.
Figure 4:
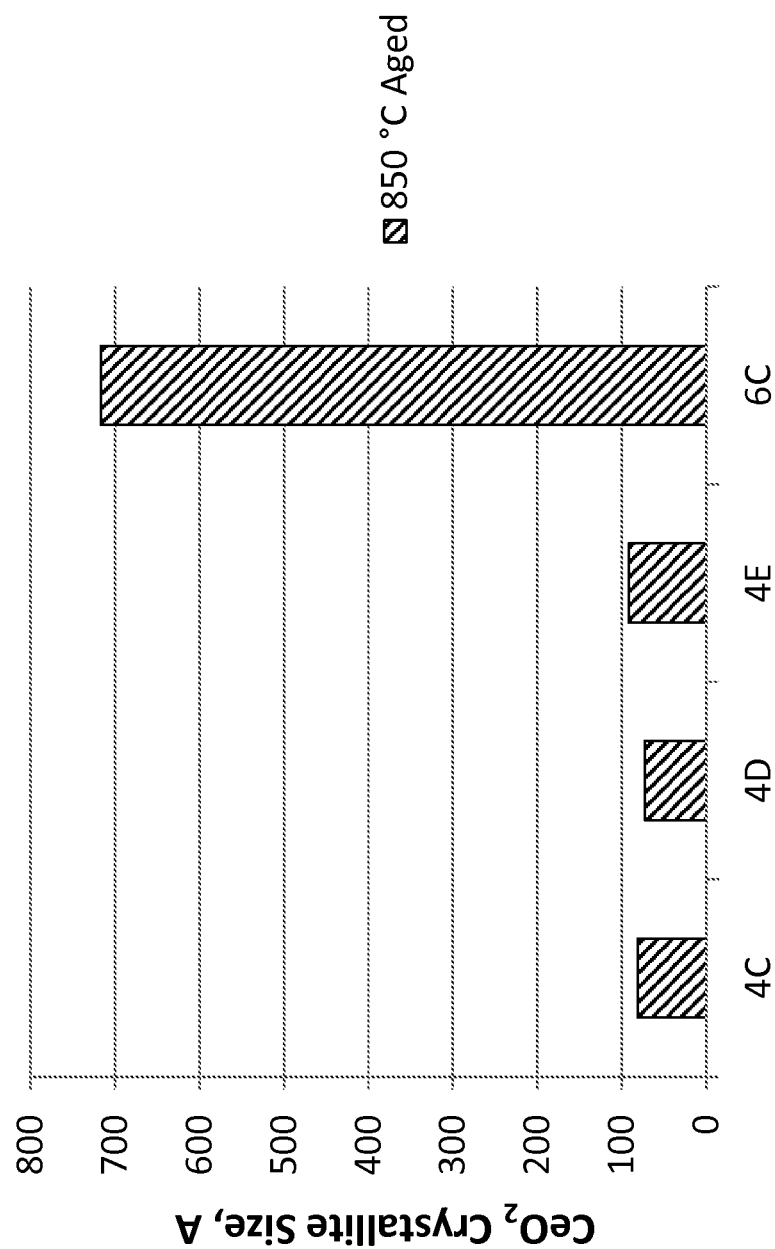
FIG. 4 is a graph of crystallite size of the $CeO_2$ as measured by XRD according to the Examples 4C, 4D, 4E, and 6C after aging at 850° C. for 8 hours in 10% steam/air.

The crystallite size of pure ceria increased from 59 to 354 Å. However, a tremendous stabilization effect was observed when the materials were impregnated with barium acetate to yield 26% of $BaCO_3$. Referring to FIG. 3, after aging at 950° C. for 5 hours in 2% $O_2$ and 10% steam in $N_2$, the $CeO_2$ crystallite sizes of the $BaCO_3$/($CeO_2$—$Al_2O_3$) samples were within 79 to 158 Å. This is remarkably lower than that of aged $BaCO_3$/$CeO_2$ powder (>1000 Å). Alternative $BaCO_3$ loadings were applied on 70% $CeO_2$/$Al_2O_3$ powder (see Sample 4A) to determine if they can also provide a similar effect. Referring to FIG. 4, after aging at 850° C. for 8 hr in 10% steam/air, the samples loaded with 19, 13, and 6 wt % $BaCO_3$ show much lower $CeO_2$ crystallite size than the $BaCO_3$/$CeO_2$ (Sample 6C). Overall, it appears that barium carbonate has a unique stabilization effect on ceria crystallite growth in a Ba/Ce/Al system. This stabilization effect is likely beneficial for $NO_x$ trapping in LNT catalysts. The additional ceria surface area resulting from smaller crystallite sizes will allow for more low temperature ceria based $NO_x$ trapping, improve WGS, and improve PGM dispersion.

Thus, according to embodiments, the ceria is destabilized in a Ba—Ce system, and is significantly stabilized in a Ba—Ce—Al system.

In one or more embodiments, without intending to be bound by theory, it is thought that the additional ceria surface area resulting from smaller crystallite sizes allows for higher $BaCO_3$ based $NO_x$ trapping due to better $BaCO_3$ dispersing, higher $CeO_2$ based $NO_x$ trapping at low temperature, improved $NO_x$ reduction due to more efficient WGS, and improved NO oxidation and $NO_x$ reduction due to better PGM dispersion.

In one or more embodiments, the significantly improved $NO_x$ conversion upon high temperature severe aging allows the placement of the LNT according to one or more embodiments in a close-coupled position, which is beneficial for reducing system $N_2O$ emissions because $N_2O$ formation decreases with temperature increasing.

Typically, the lean $NO_x$ trap catalyst washcoat composition of the present invention is disposed on a substrate. The substrate may be any of those materials typically used for preparing catalysts, and will typically comprise a ceramic or metal honeycomb structure. Any suitable substrate may be employed, such as a monolithic substrate of the type having fine, parallel gas flow passages extending therethrough from an inlet or an outlet face of the substrate, such that passages are open to fluid flow therethrough (referred to herein as flow-through substrates). The passages, which are essentially straight paths from their fluid inlet to their fluid outlet, are defined by walls on which the catalytic material is coated as a washcoat so that the gases flowing through the passages contact the catalytic material. The flow passages of the monolithic substrate are thin-walled channels, which can be of any suitable cross-sectional shape and size such as trapezoidal, rectangular, square, sinusoidal, hexagonal, oval, circular, etc.

Such monolithic substrates may contain up to about 900 or more flow passages (or "cells") per square inch of cross section, although far fewer may be used. For example, the substrate may have from about 7 to 600, more usually from about 100 to 400, cells per square inch ("cpsi"). The cells can have cross sections that are rectangular, square, circular, oval, triangular, hexagonal, or are of other polygonal shapes. The ceramic substrate may be made of any suitable refractory material, e.g., cordierite, cordierite-alumina, silicon nitride, or silicon carbide, or the substrates may be composed of one or more metals or metal alloys.

The lean $NO_x$ trap catalyst washcoat compositions according to embodiments of the present invention can be applied to the substrate surfaces by any known means in the art. For example, the catalyst washcoat can be applied by spray coating, powder coating, or brushing or dipping a surface into the catalyst composition.

In one or more embodiments, the LNT catalyst is disposed on a honeycomb substrate.

Reference to a "support" in a catalyst washcoat layer refers to a material that receives precious metals, stabilizers, promoters, binders, and the like through association, dispersion, impregnation, or other suitable methods. Useful high-surface area supports include one or more refractory oxides. These oxides include, for example, silica and alumina, titania and zirconia include mixed oxide forms such as silica-alumina, aluminosilicates which may be amorphous or crystalline, alumina-zirconia, alumina-ceria and the like and titanium-alumina and zirconium-silicate. In one embodiment, the support is comprised of alumina which includes the members of the gamma, delta, theta or transitional aluminas, such as gamma and beta aluminas, and, if present, a minor amount of other refractory oxide, e.g., about up to 20 weight percent. High surface refractory metal oxide supports refer to support particles having pores larger than 20 Å and a wide pore distribution. High surface area refractory metal oxide supports, e.g., alumina support materials, also referred to as "gamma alumina" or "activated alumina," typically exhibit a BET surface area in excess of 60 square meters per gram ("$m^2$/g"), often up to about 200 $m^2$/g or higher. "BET surface area" refers to the Brunauer, Emmett, Teller method for determining surface area by $N_2$ adsorption. Desirably, the active alumina has a specific surface area of 60 to 350 $m^2$/g, and typically 90 to 250 $m^2$/g. In specific embodiments, the loading on the refractory oxide support is from about 0.5 to about 7 g/$in^3$, more specifically from about 2 to about 6.5 g/$in^3$ and most specifically from about 5 to about 6.5 g/$in^3$. In one or more embodiments, the loading on the refractory oxide support is about 6.3 g/$in^3$.

In one embodiment, the washcoat composition of the present invention comprises two distinct washcoat layers coated on a single substrate or substrate member, one layer (e.g., the second or top washcoat layer) over top of the other (e.g., the first or bottom washcoat layer). In this embodiment, the first or bottom washcoat layer is coated over the entire axial length of a substrate (e.g., a flow-through monolith) and the second or top washcoat layer is coated over the entire axial length of the first or bottom washcoat layer.

A second aspect of the invention is directed to a LNT catalyst. The catalyst comprises a first layer on a substrate, the first layer including ceria-alumina particles having an alkaline earth metal component supported on the particles, and a second layer on the first layer, the second layer including ceria-alumina particles substantially free of alkaline earth metal. The ceria-alumina particles include a ceria phase present in a weight percent of the composite in the range of about 20% to about 80% on an oxide basis.

As used herein, the term "substantially free" means that there are no alkaline earth metals intentionally added to the particles, and that there is less than about 1% of alkaline earth metal by weight in the ceria-alumina particles comprising the second layer. In one or more embodiments, there is no alkaline earth metal present at all in the ceria-alumina particles comprising the second layer. It is appreciated, however, by one of skill in the art that during loading some alkaline earth metals present in the first layer can migrate to the second layer, such that a trace amount of alkaline earth metal may be present in the second layer.

In one or more embodiments, the alkaline earth metal in the first layer can comprise beryllium (Be), magnesium (Mg), calcium (Ca), strontium (Sr), barium (Ba), and radium (Ra). In a specific embodiment, the alkaline earth metal component comprises a barium component. In one or more embodiments, the barium component is present in an amount of in the range of about 5% to about 30% by weight on an oxide basis of the first layer.

In one or more embodiments, the first layer and second layer further comprise at least one platinum group metal supported on the ceria-alumina particles. The platinum group metal can be selected from the group consisting of platinum, palladium, rhodium, iridium, and mixtures thereof. In a specific embodiment, the platinum group metal in the first layer is selected from platinum, palladium, and mixtures thereof, and the platinum group metal in the second layer is selected from platinum, palladium, rhodium, and mixtures thereof. In a specific embodiment, the platinum group metal in the first layer consists essentially of platinum and palladium. In a very specific embodiment, the platinum group metal in the first layer consists essentially of platinum. In a specific embodiment, the platinum group metal in the second layer consists essentially of platinum and rhodium. In a more specific embodiment, the platinum group metal in the second layer consists essentially of rhodium.

Thus, according to embodiments, the LNT catalyst comprises a first layer on a substrate, a honeycomb in particular, and a second layer on the first layer. The first layer including ceria-alumina particles having barium supported on the particles, and platinum and palladium dispersed thereon. The second layer including ceria-alumina particles that are substantially free of alkaline earth metal and platinum and rhodium dispersed thereon. The ceria-alumina particles include a ceria phase present in a weight percent of the composite in the range of about 20% to about 80% on an oxide basis, including 20%, 25%, 30%, 35%, 40%, 45%, 50%, 55%, 60%, 65%, 70%, 75%, or 80%. In a specific embodiment, the ceria-alumina particle include a ceria phase present in a weight percent of the composite in an amount of about 50% on an oxide basis.

In one or more embodiments, the $CeO_2$ is present in the form of crystallites that are hydrothermally stable and are resistant to growth into larger crystallites upon aging at 950° C. As used herein, the term "resistant to growth" means that the crystallites upon aging grow to a size no larger than an average of 130 Å. In a specific embodiment, the $CeO_2$ crystallite size, as determined by XRD, after aging the catalytic article at 950° C. for 5 hours in 2% $O_2$ and 10% steam/$N_2$ is less than 130 Å. According to one or more embodiments, the $CeO_2$ crystallite size of the powder samples and the coated catalysts are different. In the coated catalysts, other washcoat components may have a stabilization effect on $CeO_2$. Therefore, after the same 950° C. aging, the $CeO_2$ crystallite size of the coated catalyst is smaller than that of the powder.

In one or more embodiments, the composite of $CeO_2$ and $Al_2O_3$ in the LNT contains ceria in an amount in the range of 30 to 70% by weight on an oxide basis. In a specific embodiment, the composite of $CeO_2$ and $Al_2O_3$ in the second layer contains ceria in an amount in the range of 30 to 60% by weight on an oxide basis. In one or more embodiments, the composite of $CeO_2$ and $Al_2O_3$ contains ceria in an amount of about 50% by weight on an oxide basis.

In one or more embodiments, the LNT of the present invention exhibits improved $NO_x$ trapping capacity during lean operation and improved $NO_x$ reduction during rich regeneration, after aging at 950° C. for 5 hours in 2% $O_2$ and 10% steam/$N_2$. The improvement is over traditional LNT that comprise ceria not incorporated with $Al_2O_3$.

Figure 2:
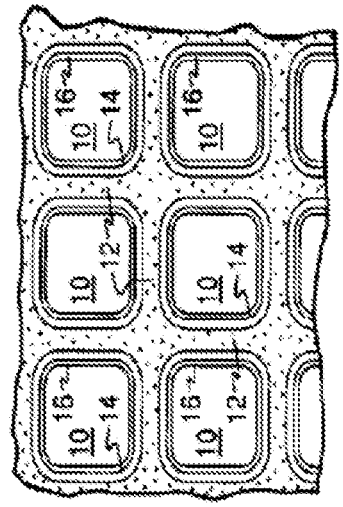
FIG. 2 is a partial cross-sectional view enlarged relative to FIG. 1 and taken along a plane parallel to the end faces of the substrate of FIG. 1, which shows an enlarged view of one of the gas flow passages shown in FIG. 1.

The washcoat composition of this invention may be more readily appreciated by reference to FIGS. 1 and 2. FIGS. 1 and 2 show a refractory substrate member 2, in accordance with one embodiment of the present invention. Referring to FIG. 1, the refractory substrate member 2 is a cylindrical shape having a cylindrical outer surface 4, an upstream end face 6 and a downstream end face 8, which is identical to end face 6. Substrate member 2 has a plurality of fine, parallel gas flow passages 10 formed therein. As seen in FIG. 2 flow passages 10 are formed by walls 12 and extend through substrate from upstream end face 6 to downstream end face 8, the passages 10 being unobstructed so as to permit the flow of a fluid, e.g., a gas stream, longitudinally through substrate via gas flow passages 10 thereof. A discrete bottom layer 14, which in the art and sometimes below is referred to as a "washcoat", is adhered or coated onto the walls 12 of the substrate member. As shown in FIG. 2, a second discrete top washcoat layer 16 is coated over the bottom washcoat layer 14.

As shown in FIG. 2, the substrate member includes void spaces provided by the gas-flow passages 10, and the cross-sectional area of these passages 10 and the thickness of the walls 12 defining the passages will vary from one type of substrate member to another. Similarly, the weight of washcoat applied to such substrates will vary from case to case. Consequently, in describing the quantity of washcoat or catalytic metal component or other component of the composition, it is convenient to use units of weight of component per unit volume of substrate. Therefore, the units of grams per cubic inch ("g/in$^3$") and grams per cubic foot ("g/ft$^3$") are used herein to mean the weight of a component per volume of the substrate member, including the volume of void spaces of the substrate member.

During operation, exhaust gaseous emissions from a lean burn engine comprising hydrocarbons, carbon monoxide, nitrogen oxides, and sulfur oxides initially encounter the top washcoat layer 16, and thereafter encounter the bottom washcoat layer 14.

In another embodiment, the distinct washcoat layers of the present invention may be zone coated such that the washcoat layer containing the HC trap component is on the upstream end of the substrate. For example, an upstream washcoat layer can be coated over a portion of the upstream region of the substrate and a downstream washcoat layer can be coated over a portion of the downstream end of the substrate. In this embodiment, the top washcoat layer of the present invention can be also coated in the upstream portion over a bottom washcoat layer on the substrate.

The LNT of the present invention can be used in an integrated emission treatment system comprising one or more additional components for the treatment of exhaust gas emissions. For example, the emission treatment system may comprise a lean burn engine upstream from the nitrogen oxide storage catalyst of one or more embodiments, and may further comprise a catalyst and, optionally, a particulate filter. In one or more embodiments, the catalyst is selected from a three-way catalyst (TWC), a diesel oxidation catalyst, and an SCR catalyst. In one or more embodiments, the particulate filter can be selected from a gasoline particulate filter, a soot filter, or a SCROF. The particulate filter may be catalyzed for specific functions. The LNT can be located upstream or downstream of the particulate filter.

In one or more embodiments, the emission treatment system may comprise a lean burn engine upstream from the nitrogen oxide storage catalyst of one or more embodiments, and may further comprise a TWC. In one or more embodiments, the emission treatment system can further comprise an SCR/LNT.

In a specific embodiment, the particulate filter is a catalyzed soot filter (CSF). The CSF can comprise a substrate coated with a washcoat layer containing one or more catalysts for burning off trapped soot and or oxidizing exhaust gas stream emissions. In general, the soot burning catalyst can be any known catalyst for combustion of soot. For example, the CSF can be coated with a one or more high surface area refractory oxides (e.g., alumina, silica, silica alumina, zirconia, and zirconia alumina) and/or an oxidation catalyst (e.g., a ceria-zirconia) for the combustion of unburned hydrocarbons and to some degree particulate matter. In one or more embodiments, the soot burning catalyst is an oxidation catalyst comprising one or more precious metal (PM) catalysts (platinum, palladium, and/or rhodium).

In general, any known filter substrate in the art can be used, including, e.g., a honeycomb wall flow filter, wound or packed fiber filter, open-cell foam, sintered metal filter, etc., with wall flow filters being specifically exemplified. Wall flow substrates useful for supporting the CSF compositions have a plurality of fine, substantially parallel gas flow passages extending along the longitudinal axis of the substrate. Typically, each passage is blocked at one end of the substrate body, with alternate passages blocked at opposite end-faces. Such monolithic substrates may contain up to about 900 or more flow passages (or "cells") per square inch of cross section, although far fewer may be used. For example, the substrate may have from about 7 to 600, more usually from about 100 to 400, cells per square inch ("cpsi"). The porous wall flow filter used in embodiments of the invention is optionally catalyzed in that the wall of said element has thereon or contained therein one or more catalytic materials, such CSF catalyst compositions are described hereinabove. Catalytic materials may be present on the inlet side of the element wall alone, the outlet side alone, both the inlet and outlet sides, or the wall itself may consist all, or in part, of the catalytic material. In another embodiment, this invention may include the use of one or more washcoat layers of catalytic materials and combinations of one or more washcoat layers of catalytic materials on the inlet and/or outlet walls of the element.

The invention is now described with reference to the following examples. Before describing several exemplary embodiments of the invention, it is to be understood that the invention is not limited to the details of construction or process steps set forth in the following description. The invention is capable of other embodiments and of being practiced or being carried out in various ways.

EXAMPLES

Example 1

Preparation of NO$_x$ Storage Material

CeO$_2$—Al$_2$O$_3$ particles (1A through 5A) were impregnated with a barium acetate solution to provide 1B through 5B having BaCO$_3$/(CeO$_2$—Al$_2$O$_3$) with a BaCO$_3$ content as specified in Table 1. The mixture was dried at 110° C. and calcined at 720° C. for 2 hours.

CeO$_2$—Al$_2$O$_3$ particles (4A) were impregnated with a barium acetate solution to provide 4C through 4E having BaCO$_3$/(CeO$_2$—Al$_2$O$_3$) with a BaCO$_3$ content as specified in Table 1. The mixture was dried at 110° C. and calcined at 620° C. for 2 hours.

CeO$_2$ particles (6A) were impregnated with a barium acetate solution to provide 6B and 6C having BaCO$_3$/CeO$_2$ with a BaCO$_3$ content as specified in Table 1. The mixture was dried at 110° C. and calcined at 600° C. for 2 hours.

Referring to FIG. 3, after aging at 950° C. for 5 hours in 2% O$_2$ and 10% steam in N$_2$, the CeO$_2$ crystallite sizes of the BaCO$_3$/(CeO$_2$—Al$_2$O$_3$) samples 1B-5B were within 79 to 158 Å.

Referring to FIG. 4, the CeO$_2$ crystallite sizes of the BaCO$_3$/(CeO$_2$—Al$_2$O$_3$) samples 4C through 4E were within 73 to 92 Å after aging at 850° C. for 8 hours in 10% steam in air.

Table 1 shows the content of 1A through 6A, and 1B through 6B, 6C, 4C through 4E.

TABLE 1

| Sample | BaCO$_3$ wt % | CeO$_2$ wt % | Al$_2$O$_3$ wt % | BET Surface Area, m$^2$/g As is | 950° C. aged* |
|---|---|---|---|---|---|
| 1A | 0 | 30 | 70 | | |
| 2A | 0 | 50 | 50 | | |
| 3A | 0 | 60 | 40 | | |
| 4A | 0 | 70 | 30 | | |
| 5A | 0 | 80 | 20 | | |
| 6A | 0 | 100 | 0 | 167 | 27 |
| 1B | 26 | 22 | 52 | 122 | 79 |
| 2B | 26 | 37 | 37 | 119 | 66 |
| 3B | 26 | 44 | 30 | 93 | 39 |
| 4B | 26 | 52 | 22 | 78 | 33 |
| 5B | 26 | 59 | 15 | 76 | 21 |
| 6B | 26 | 74 | 0 | 83 | 3 |
| 4C | 19 | 57 | 24 | | |
| 4D | 13 | 61 | 26 | | |
| 4E | 6 | 66 | 28 | | |
| 6C | 19 | 81 | 0 | | |

*Aging conditions: 950° C. for 5 hours in 2% O$_2$ and 10% steam in N$_2$

Example 2

XRD Measurement

The CeO$_2$ crystallite size of the Example 1 samples was measured by XRD. The samples were ground using a mortar and pestle. The resultant powders were then back packed into flat plate mounts for analysis. A θ-θ PANalytical X'Pert Pro MPD X-ray diffraction system was used to collect data in Bragg-Brentano geometry. The optical path consisted of the X-ray tube, 0.04 rad soller slit, ¼° divergence slit, 15 mm beam mask, ½° anti-scatter slit, the sample, ¼° anti-scatter slit, 0.04 rad soller slit, Ni° filter, and a PIXcel linear position sensitive detector with a 2.114° active length. Cu$_{k\alpha}$ radiation was used in the analysis with generator settings of 45 kV and 40 mA. X-ray diffraction data was collected from 10° to 90° 2θ using a step size of 0.026° and a count time of 600 s per step. Phase identification was done using Jade software. All numerical values were determined using Rietveld methods.

Example 3

Preparation of LNT Catalyst

To demonstrate the advantage of this invention, an example of a LNT catalyst comprising $BaCO_3$ supported on $CeO_2$—$Al_2O_3$ particles was prepared. This two layer formulation, which comprises an undercoat layer and a top washcoat layer, was coated onto a flow-through monolith substrate carrier having a cell density of 400 cells per square inch (cpsi) and a 4 mil wall thickness, the top washcoat layer being coated over the undercoat washcoat layer. The catalyst has a total 120 g/ft³ PGM nominal loading with a Pt/Pd/Rh ratio of 103/12/5.

The first $NO_x$ trap layer includes 2B prepared in EXAMPLE 1. The first layer contains an activated γ-alumina, cerium oxide, barium carbonate, magnesia, zirconia, platinum, and palladium at concentrations of approximately 33.5%, 32.5%, 22.5%, 7.1%, 3.6%, 0.8% and 0.12%, respectively, based on the calcined weight of the catalyst. Pd in the form of palladium nitrate and Pt in the form of platinum amine solution were introduced onto the $BaCO_3$/($CeO_2$/γ-$Al_2O_3$) by conventional incipient wetness techniques. The total washcoat loading of the first layer after 550° C. calcination for one hour in air was about 5.6 g/in³.

The second $NO_x$ trap layer, which is disposed on the first layer, includes ceria-alumina particles (Sample 2A) that are substantially free of alkaline earth metals. The second layer contains an activated γ-alumina, ceria, platinum, and rhodium at concentrations of approximately 48.8%, 48.8%, 2%, and 0.4%, respectively, based on the calcined weight of the catalyst. Pt in the form of platinum amine solution and Rh in the form of rhodium nitrate were introduced onto Sample 2A by conventional incipient wetness techniques. The second $NO_x$ trap layer was coated over the entire first $NO_x$ trap layer. The total washcoat of the second layer after 550° C. calcination was about 0.72 g/in³.

Example 4

Comparative

LNT catalyst was prepared in accordance with EXAMPLE 3 above, except that the material 2B from Example 1 in the first coat was substituted with a physical mixture of ceria and γ-alumina in 1:1 weight ratio loaded with 26% of $BaCO_3$ in exactly the same preparation procedure as described in Example 1. The material 1B in the second layer was substituted with a physical mixture of ceria and γ-alumina in 1:1 weight ratio.

Example 5

Testing

Cycle $NO_x$ Conversion and $NO_x$ Storage Capacity Testing

LNT catalyst from Examples 3 and 4 were evaluated in fresh and after aging at 950° C. for 5 hours in 2% $O_2$ and 10% steam in $N_2$. The catalysts were evaluated on a reactor test rig with FTIR analytical apparatus. The evaluations were conducted with 10 cycles consisting of 120 seconds lean gas exposure and 5 seconds rich gas exposure. A purging with a gas mixture of $CO_2$, $H_2O$, and $N_2$ was applied between lean gas exposure and rich gas exposure for the evaluations at 200, 250, 300, 350, and 400° C. in 10, 10, 6, 4, and 4 seconds, respectively. After lean/rich cycles, the catalyst was regenerated in rich gas for 1 minute, and then exposed to lean gas. The feeding gas compositions and space velocities at each testing temperatures are listed in Table 2.

TABLE 2

| Inlet Temperature, ° C. | 200 and 250 | | 300 | | 350 | | 400 | | 450 | | 500 | |
|---|---|---|---|---|---|---|---|---|---|---|---|---|
| SV, hr⁻¹ | 25,000 | | 40,000 | | 55,000 | | 70,000 | | 55,000 | | 80,000 | |
|  | Lean | Rich | Lean | Rich | Lean | Rich | Lean | Rich | Lean | Rich | Lean | Rich |
| $O_2$, % | 13 | 0 | 11 | 0 | 11 | 0 | 6 | 0 | 11 | 0 | 6 | 0 |
| $CO_2$, % | 4.15 | 4.15 | 4.15 | 4.15 | 5 | 5 | 5 | 5 | 5 | 5 | 5 | 5 |
| NO, ppm | 300 | 0 | 300 | 0 | 300 | 0 | 300 | 0 | 300 | 0 | 300 | 0 |
| $CO/H_2$ (3:1), % | 0 | 4.5 | 0 | 4.5 | 0 | 4.5 | 0 | 4.5 | 0 | 4.5 | 0 | 4.5 |
| HC*, ppm | 100 | 1000 | 100 | 1000 | 100 | 1000 | 100 | 1000 | 100 | 1000 | 100 | 1000 |
| $H_2O$, % | 8 | 8 | 8 | 8 | 8 | 8 | 8 | 8 | 8 | 8 | 8 | 8 |

The $NO_x$ trapping capacity of the catalyst was measured after the end of the 1 minute rich exposure and presented as the amount of $NO_x$ removed from the feeding gas when 100 ppm of $NO_x$ was released. The cycle $NO_x$ conversion of the catalyst was measured as an average $NO_x$ conversion of the last five lean/rich cycles.

Cycle $NO_x$ conversion (%)=[$NO_x$ input−$NO_x$ output)×100%]/$NO_x$ input

Figure 5A:
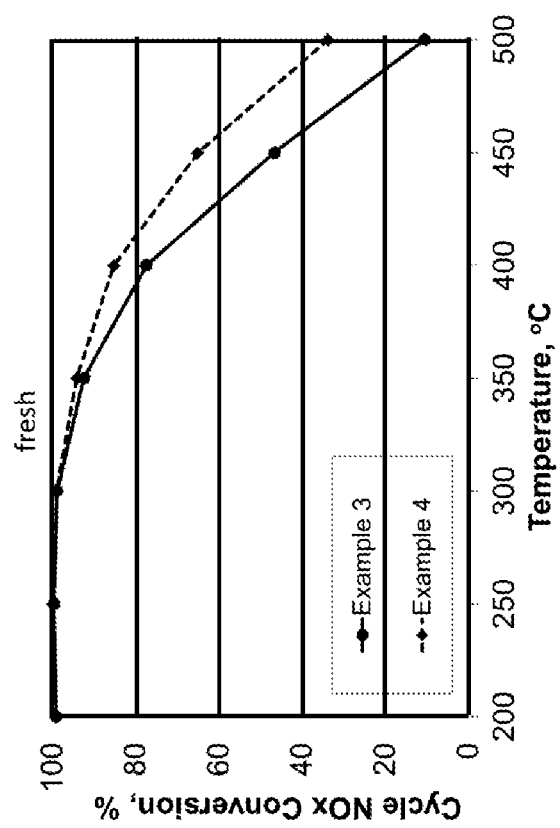
FIG. 5A is a graph of the cycle $NO_x$ conversion according to the Examples 3 and 4 in fresh states.
Figure 5B:
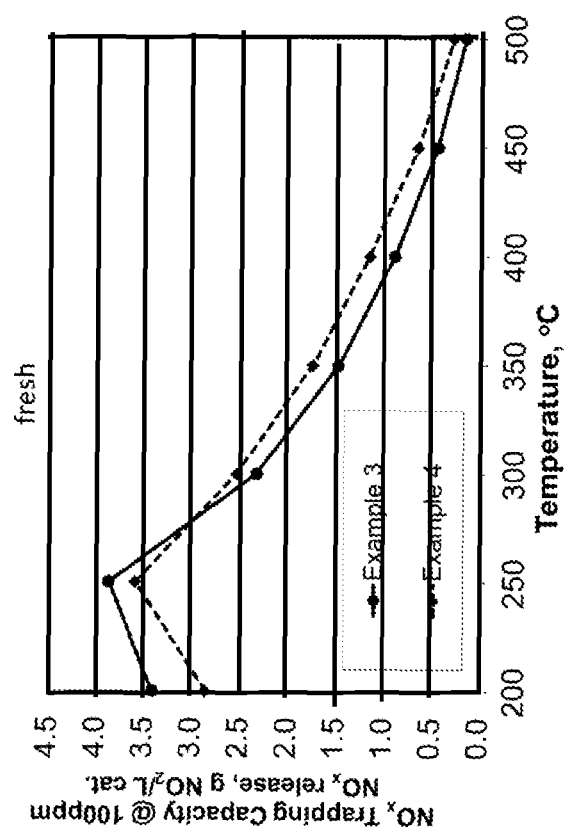
FIG. 5B is a graph of the $NO_x$ trapping capacity according to the Examples 3 and 4 in fresh states.
Figure 6A:
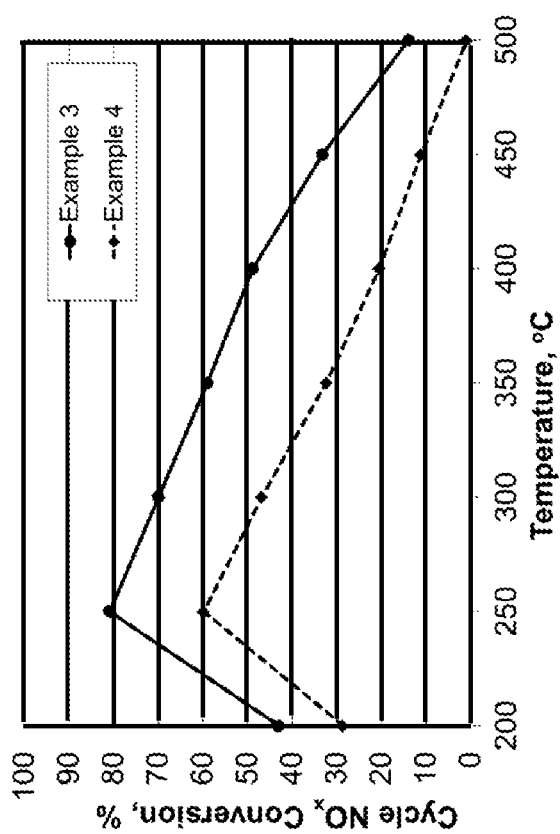
FIG. 6A is a graph of the cycle $NO_x$ conversion according to the Examples 3 and 4 after aging at 950° C. for 5 hours in 2% $O_2$ and 10% steam in $N_2$.
Figure 6B:
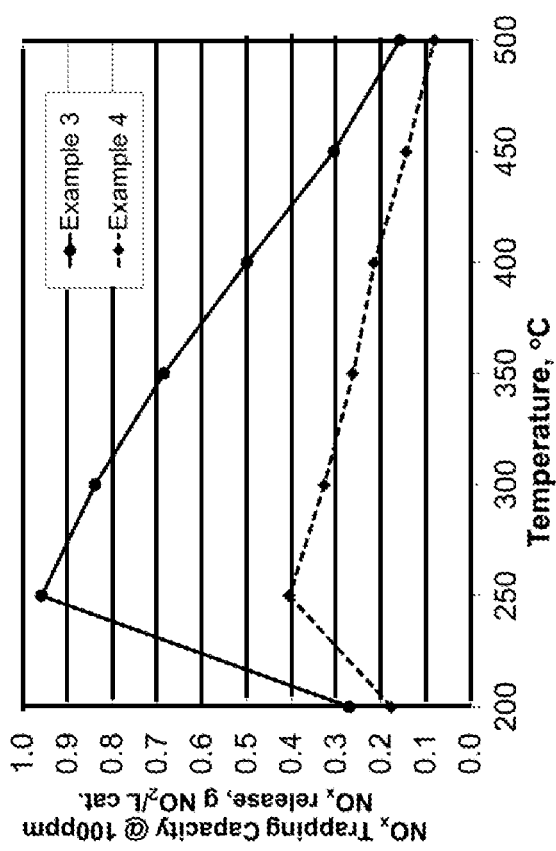
FIG. 6B is a graph of the $NO_x$ trapping capacity according to the Examples 3 and 4 after aging at 950° C. for 5 hours in 2% $O_2$ and 10% steam in $N_2$.

FIGS. 5A and 5B show the cycle $NO_x$ conversions and $NO_x$ trapping capacities of Examples 3 and 4 tested in fresh. Both catalysts showed comparable good $NO_x$ performance. However, after 950° C. aging, Example 3 showed significantly higher $NO_x$ trapping capacity and cycle $NO_x$ conversion than Example 4, as shown in FIGS. 6A and 6B.

Example 3 also has significantly higher $NO_x$ reduction activity than Example 4. As shown in FIG. 7, at 250° C., the $NO_x$ release during rich regeneration reached 1200 ppm for Example 4, and the $NO_x$ release of Example 3 was only about 160 ppm.

XRD analysis after 950° C. for 5 hours 2% $O_2$ 10% steam/$N_2$ aging indicated that $CeO_2$ crystallite size of Example 3 was 109 Å and $CeO_2$ crystallite size of Example 4 was 175 Å.

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments. The order of description of the above method should not be considered limiting, and methods may use the described operations out of order or with omissions or additions.

It is to be understood that the above description is intended to be illustrative, and not restrictive. Many other embodiments will be apparent to those of ordinary skill in the art upon reviewing the above description. The scope of the invention should, therefore, be determined with reference to the appended claims, along with the full scope of equivalents to which such claims are entitled.

What is claimed is:

1. A nitrogen oxide storage catalyst comprising:
a layer on a substrate including ceria-alumina composite particles having a ceria phase present in a weight percent of the composite particles in the range of about 20% to about 80% on an oxide basis, a barium component supported on at least a portion of the ceria-alumina composite particles, wherein the $CeO_2$ is present in the form of crystallites that are hydrothermally stable and have an average crystallite size of less than 130 Å after aging at 950° C. for 5 hours in 2% $O_2$ and 10% steam in $N_2$, the layer comprises a first washcoat layer on the substrate and a second washcoat layer on the first washcoat layer, wherein the second washcoat layer is substantially free of alkaline earth metal.

2. The nitrogen oxide storage catalyst of claim 1, further comprising at least one platinum group metal selected from the group consisting of platinum, palladium, rhodium, iridium, and mixtures thereof, supported on the ceria-alumina composite particles.

3. The nitrogen oxide storage catalyst of claim 2, wherein the platinum group metal is selected from platinum, palladium, rhodium, and mixtures thereof.

4. The nitrogen oxide storage catalyst of claim 1, wherein the barium component is present in an amount in the range of about 5% to 30% by weight on an oxide basis of the first washcoat layer.

5. The nitrogen oxide storage catalyst of claim 1, wherein the first washcoat layer comprises
ceria-alumina composite particles having the barium component supported thereon and
the second washcoat layer comprises ceria-alumina composite particles substantially free of the barium component.

6. The nitrogen oxide storage catalyst of claim 5, wherein the barium component is present in an amount of in the range of about 5% to 30% by weight on an oxide basis of the first washcoat layer.

7. The nitrogen oxide storage catalyst of claim 5, wherein the first washcoat layer is disposed on a honeycomb substrate.

8. The nitrogen oxide storage catalyst of claim 5, wherein the composite particles of $CeO_2$ and $Al_2O_3$ contains ceria in an amount in the range of about 30 to 70% by weight on an oxide basis.

9. The nitrogen oxide storage catalyst of claim 5, wherein the composite particles of $CeO_2$ and $Al_2O_3$ in the second washcoat layer contains ceria in an amount in the range of about 30 to 60% by weight on an oxide basis.

10. The nitrogen oxide storage catalyst of claim 5, wherein the first washcoat layer and second washcoat layer further comprise at least one platinum group metal selected from the group consisting of platinum, palladium, rhodium, iridium and mixtures thereof, supported on the ceria-alumina particles.

11. The nitrogen oxide storage catalyst of claim 10, wherein the platinum group metal in the second washcoat layer is selected from platinum, rhodium, and mixtures thereof.

12. The nitrogen oxide storage catalyst of claim 10, wherein the platinum group metal in the first washcoat layer consists essentially of platinum and palladium.

13. The nitrogen oxide storage catalyst of claim 10, wherein the platinum group metal in the first washcoat layer consists essentially of platinum.

14. The nitrogen oxide storage catalyst of claim 10, wherein the platinum group metal in the first washcoat layer is selected from platinum, palladium, and mixtures thereof.

15. The nitrogen oxide storage catalyst of claim 14, wherein the platinum group metal in the second washcoat layer consists essentially of platinum and rhodium.

16. The nitrogen oxide storage catalyst of claim 14, wherein the platinum group metal in the second washcoat layer consists essentially of rhodium.

17. A system comprising the nitrogen oxide storage catalyst of claim 1 and a lean burn engine upstream from the nitrogen oxide storage catalyst.

18. The system of claim 17 further comprising a catalyst and, optionally, a particulate filter.

19. The system of claim 18, wherein the catalyst is selected from a TWC catalyst, SCR catalyst, and diesel oxidation catalyst.

20. The nitrogen oxide storage catalyst of claim 1, wherein the barium component is selected from the group consisting of barium oxide and barium carbonate.

* * * * *

UNITED STATES PATENT AND TRADEMARK OFFICE
CERTIFICATE OF CORRECTION

PATENT NO. : 9,610,564 B2  
APPLICATION NO. : 14/204386  
DATED : April 4, 2017  
INVENTOR(S) : Wen-Mei Xue et al.

Page 1 of 1

It is certified that error appears in the above-identified patent and that said Letters Patent is hereby corrected as shown below:

On the Title Page

In Page 2, Item (56), References Cited, Foreign Patent Documents, Cite No. 2, delete "GB 2736903 12/2002" and insert --GB 2376903 12/2002--, therefor.

In the Claims

In Column 15, Claim 1, Line 26, after "steam in $N_2$," insert --wherein--.

Signed and Sealed this  
Fourth Day of July, 2017

Joseph Matal  
*Performing the Functions and Duties of the*  
*Under Secretary of Commerce for Intellectual Property and*  
*Director of the United States Patent and Trademark Office*